Aug. 16, 1927.
W. H. CARRIER
1,639,023
REFRIGERATING SYSTEM
Filed Aug. 7, 1923     8 Sheets-Sheet 3
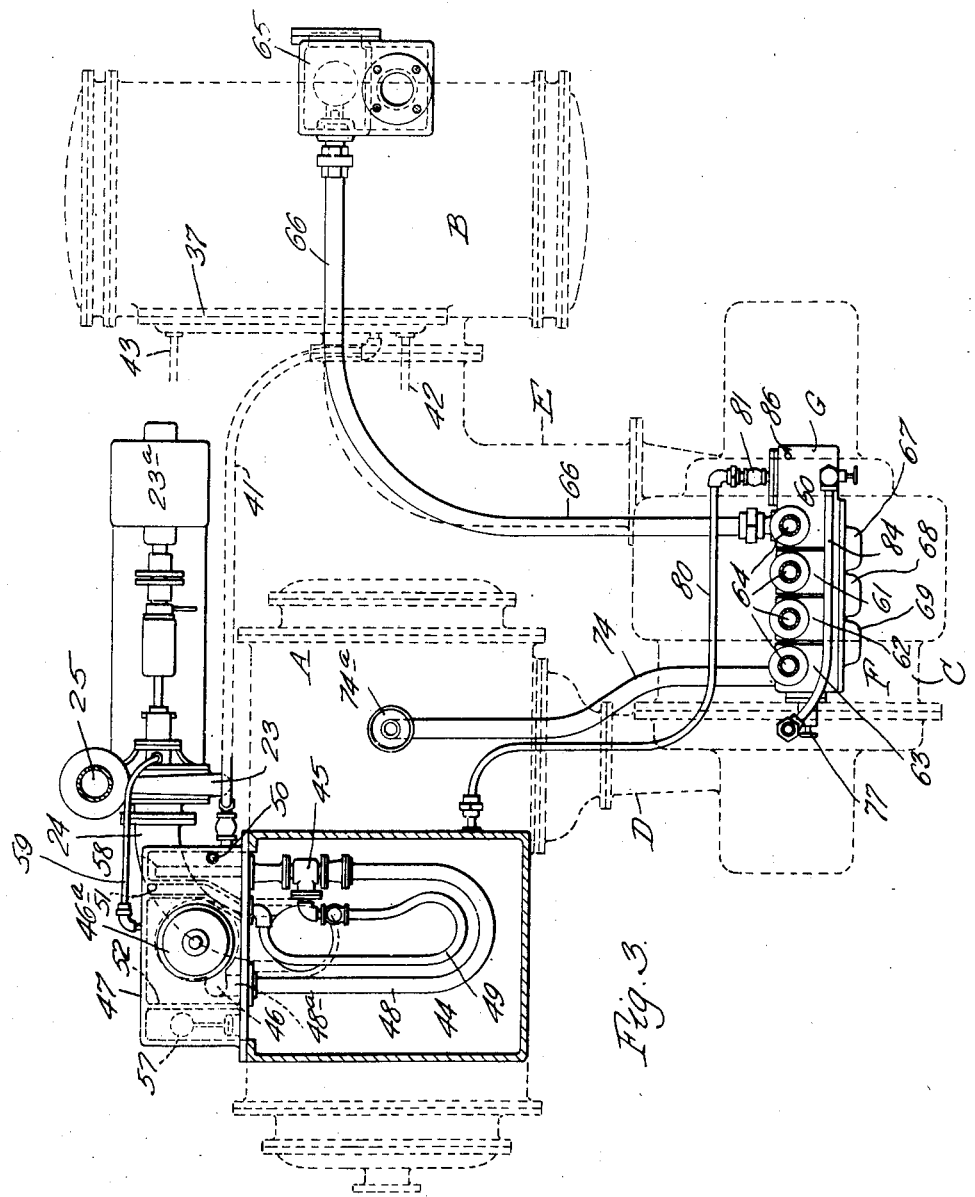
INVENTOR.
Willis H. Carrier
by Parker & Prochnow.
ATTORNEYS.

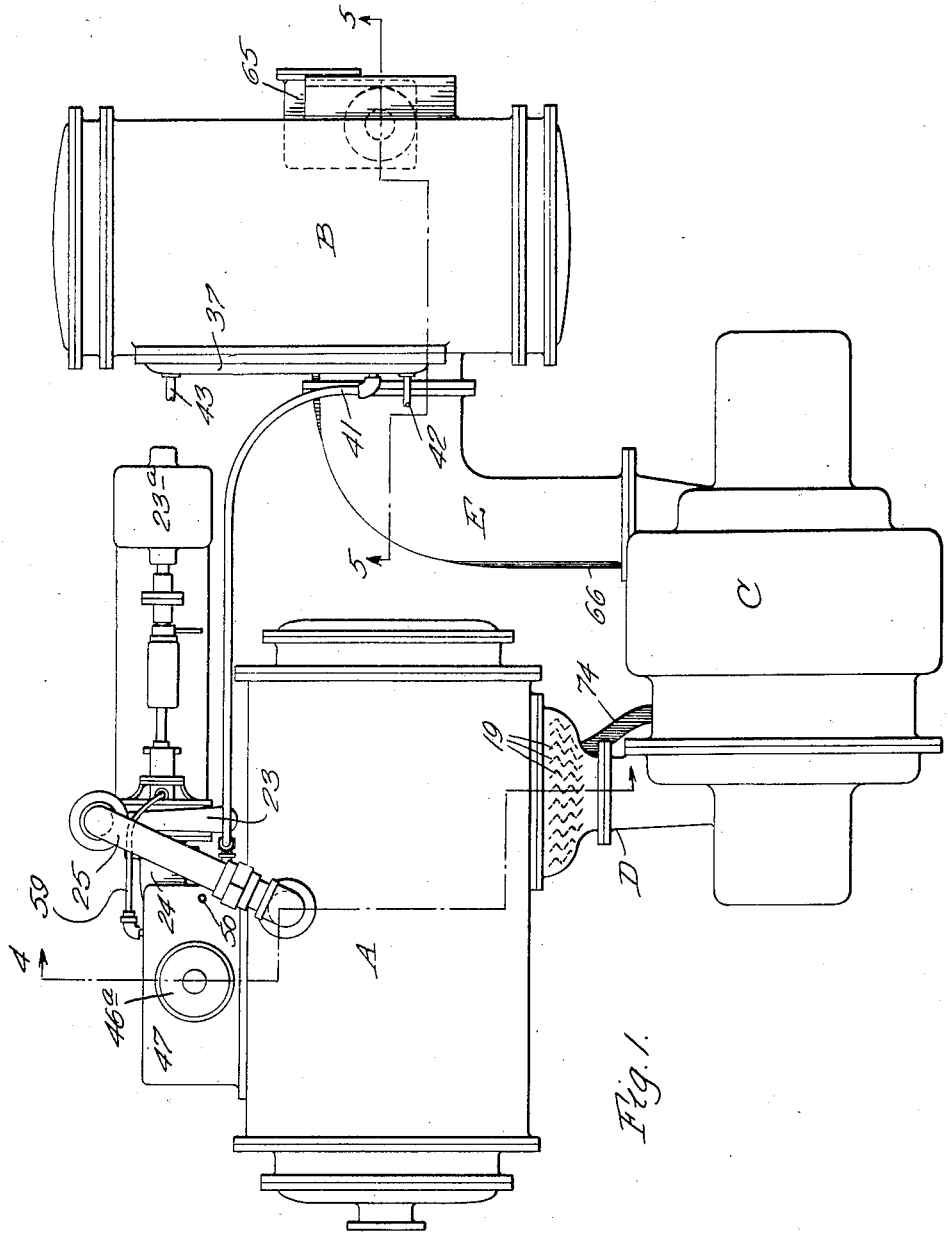

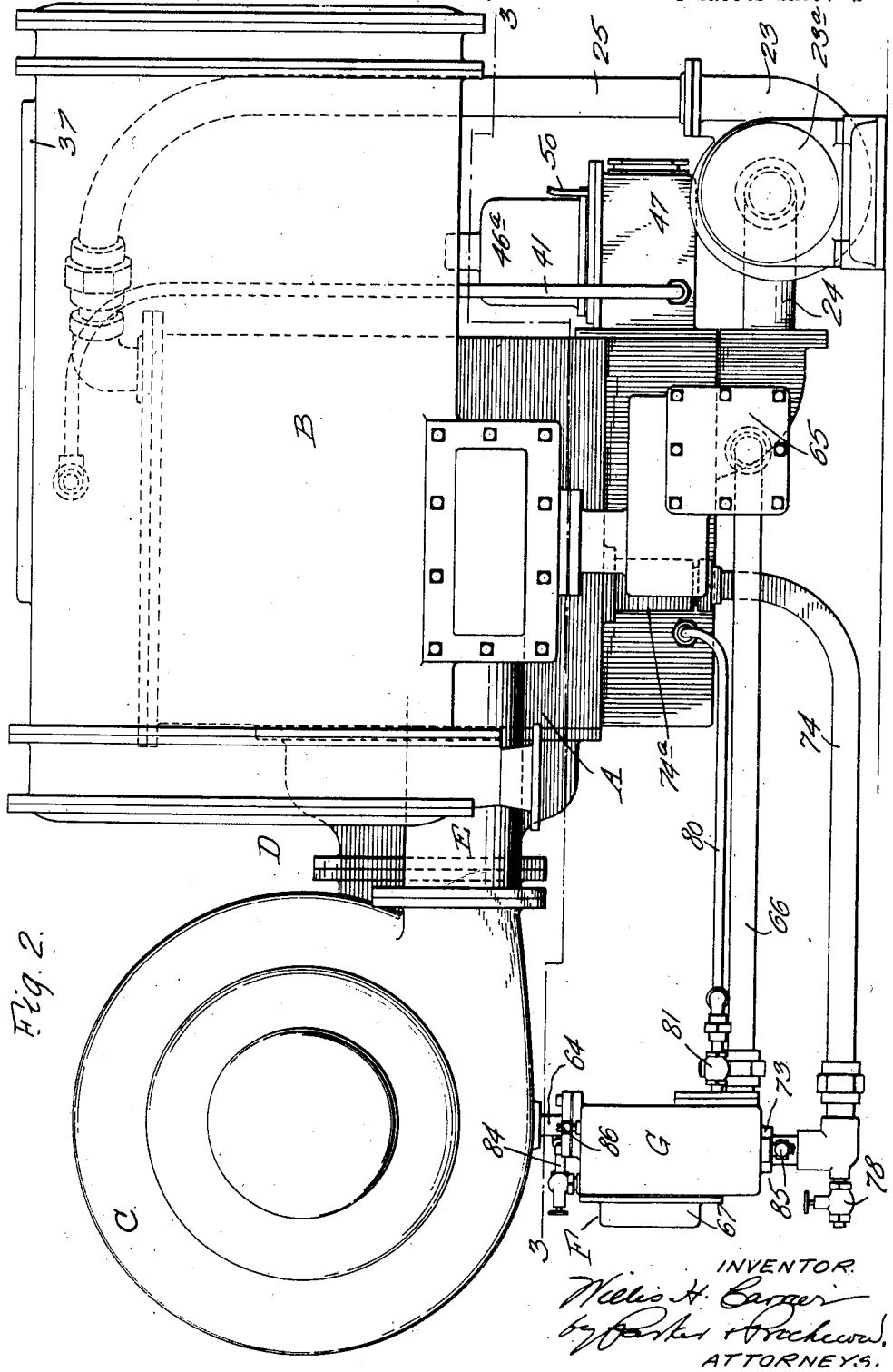

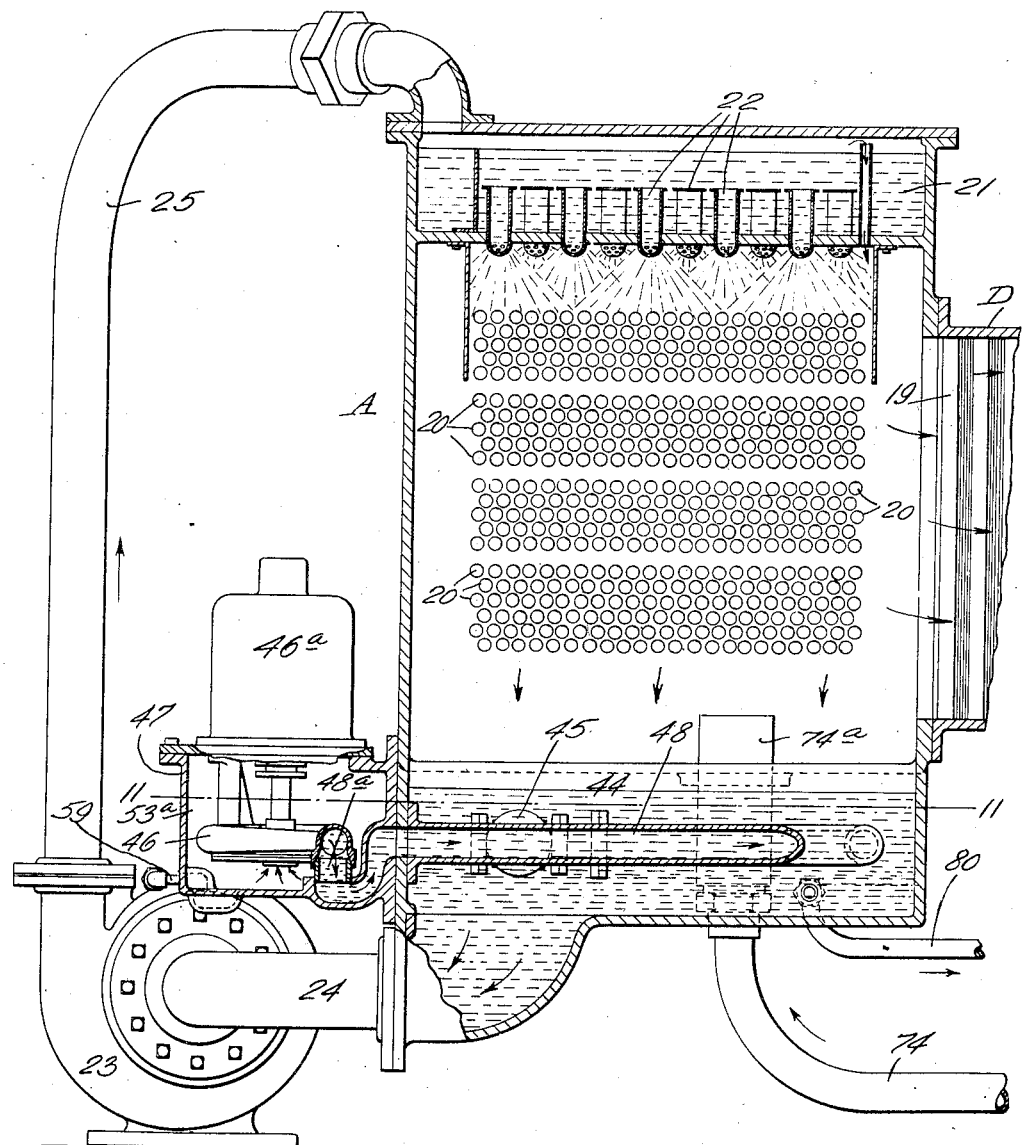

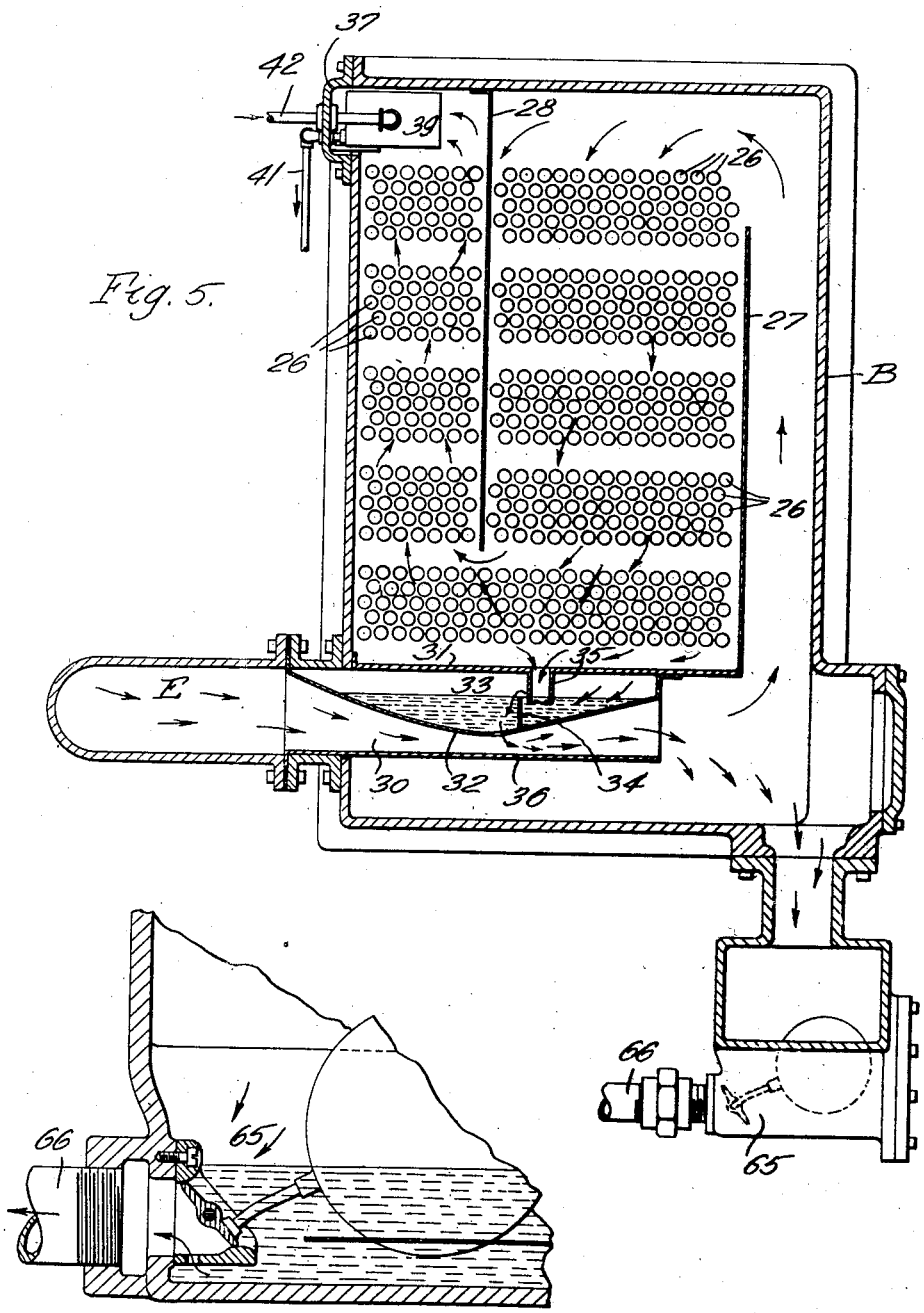

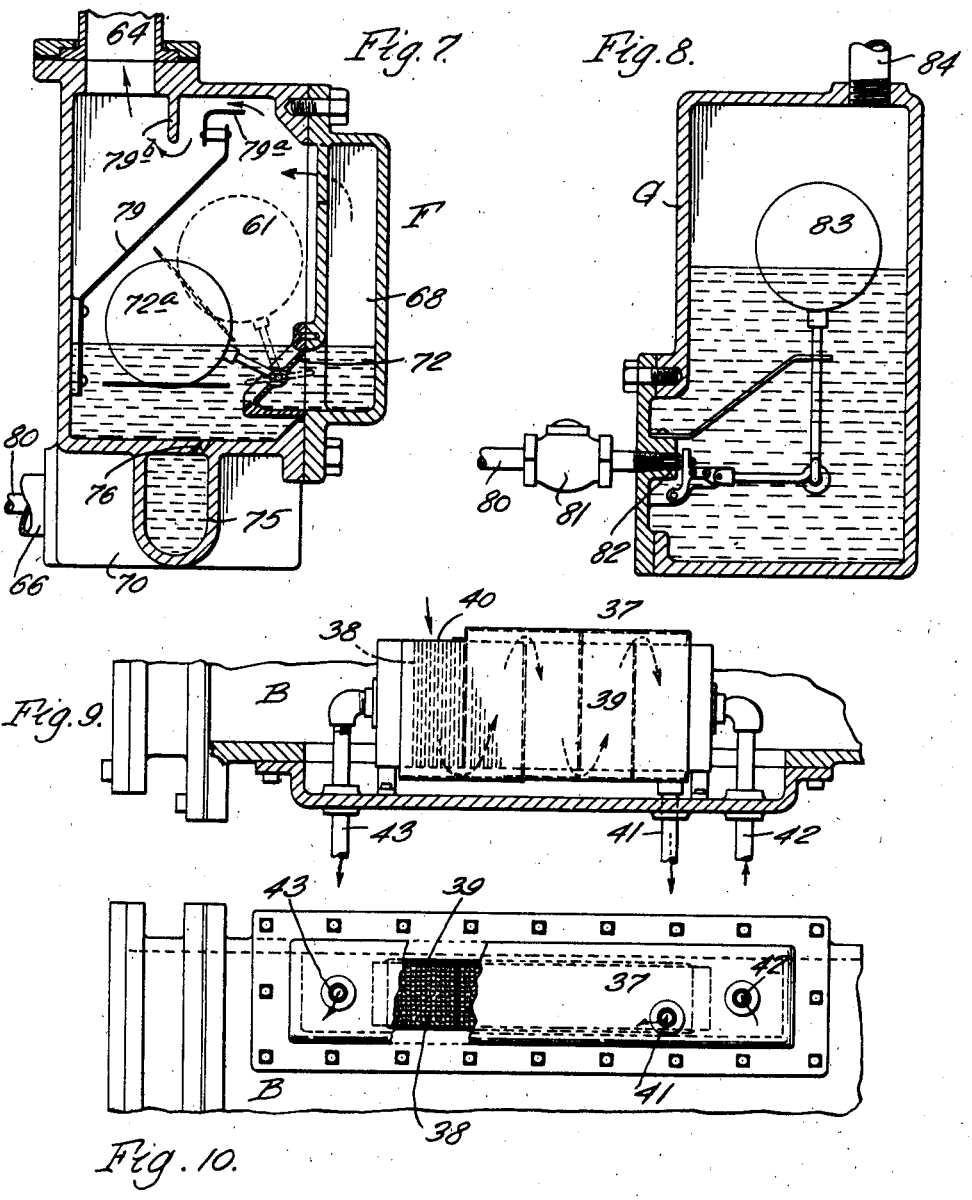

Aug. 16, 1927.
W. H. CARRIER
1,639,023
REFRIGERATING SYSTEM
Filed Aug. 7, 1923
8 Sheets-Sheet 7
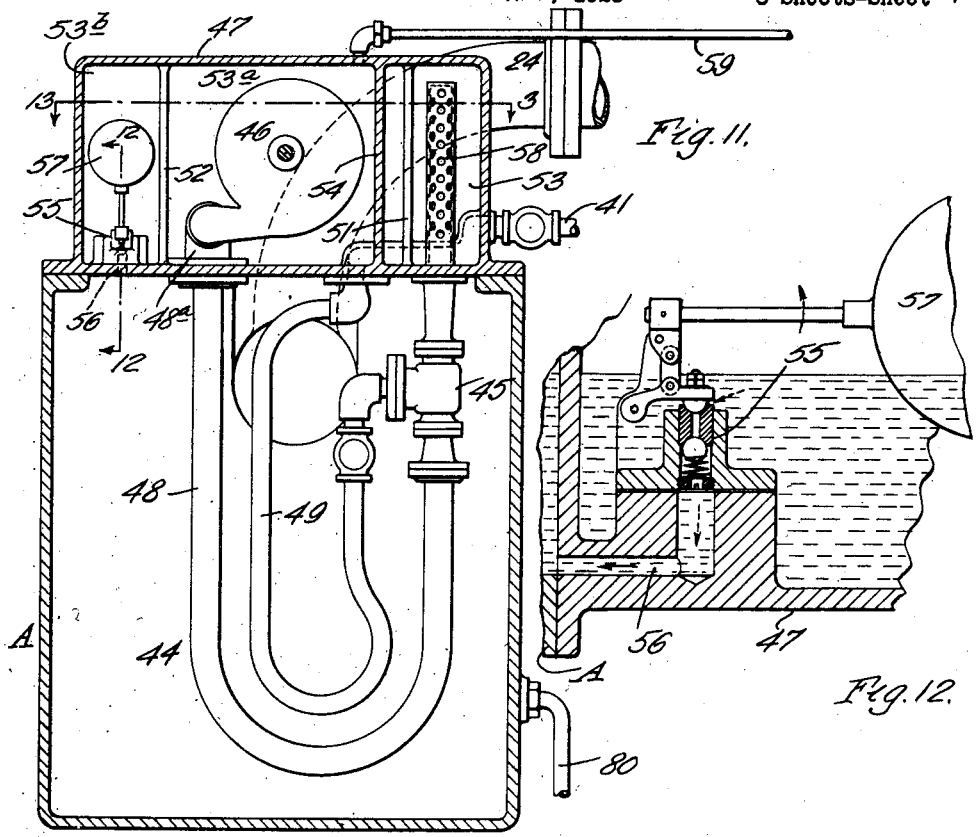
Fig. 11.
Fig. 12.
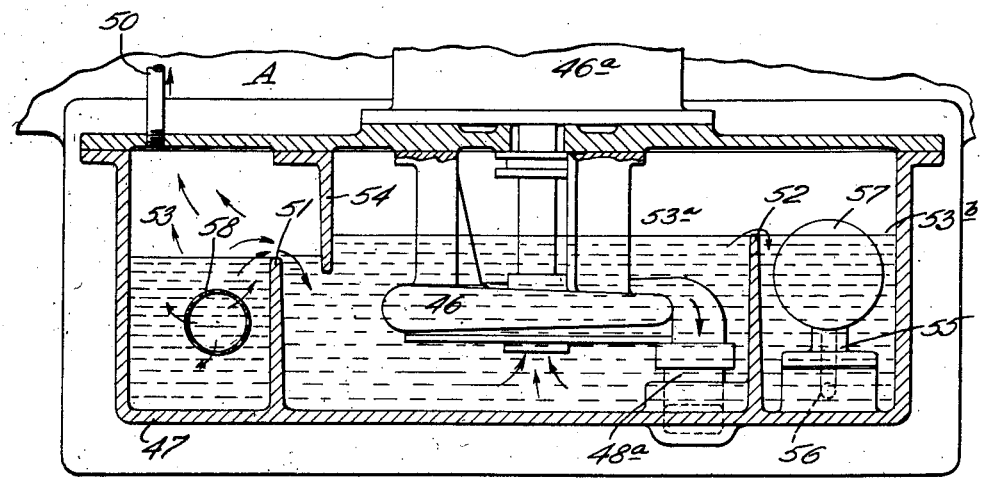
Fig. 13.
INVENTOR
Willis H. Carrier
by Parker & Rockwood
ATTORNEYS.

Aug. 16, 1927.
W. H. CARRIER
1,639,023
REFRIGERATING SYSTEM
Filed Aug. 7, 1923    8 Sheets-Sheet 8
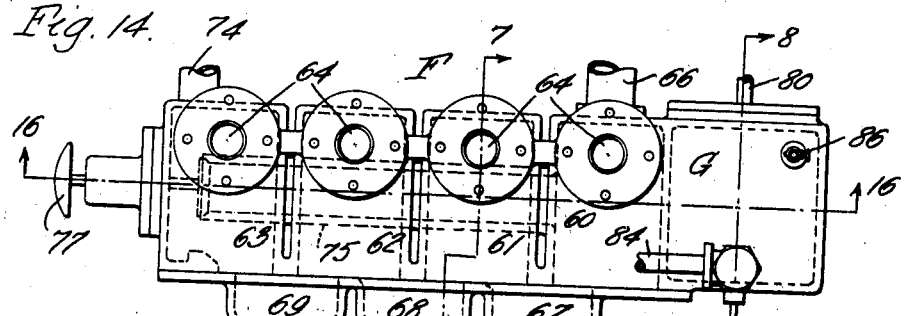
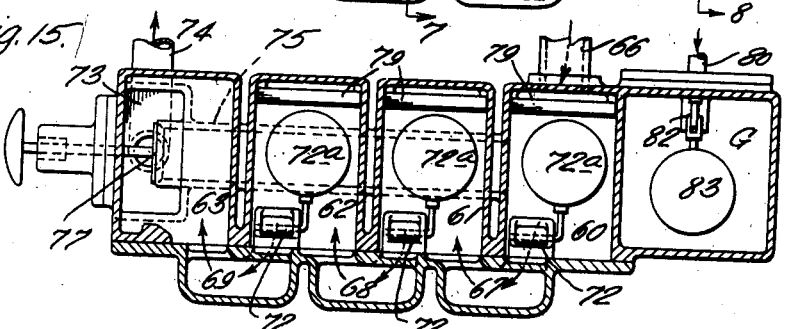
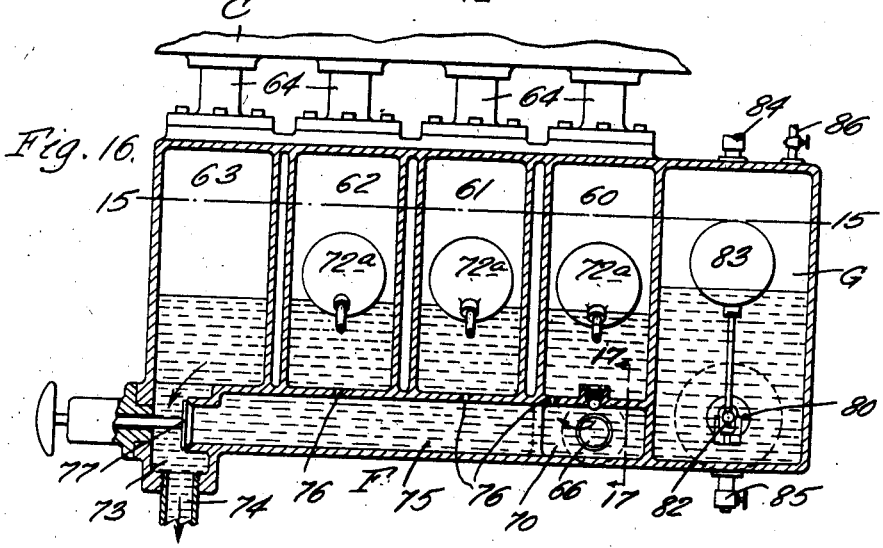
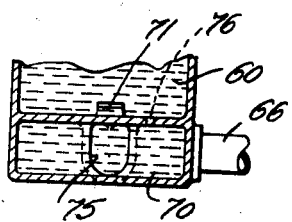
INVENTOR.
Willis H. Carrier
by Parker & Brochcow,
ATTORNEYS.

Patented Aug. 16, 1927.

1,639,023

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

REFRIGERATING SYSTEM.

Application filed August 7, 1923. Serial No. 656,152.

This invention relates to improvements in refrigerating systems of the compression type in which a volatile liquid refrigerant is vaporized, compressed and condensed, and more particularly to improvements in refrigerating systems of the general character heretofore invented by me in which the refrigerant vapor is withdrawn from the evaporator and delivered at a higher pressure to the condenser by means of a centrifugal or non-positive type of fan or compressor adapted to handle relatively large volumes of gas at low differences of pressure, and in which a refrigerant is used that has a low vapor pressure and high specific density. I preferably use dichloroethylene as the refrigerant, and preferably the system is designed so as to operate under vacuum or below atmospheric pressure in both the evaporator and in the condenser, although the refrigerating apparatus herein disclosed is not necessarily limited to a system in which the condenser operates at a pressure lower than atmospheric pressure.

One object of the invention is to produce a practical refrigerating system of the character mentioned, which will be efficient and economical in operation, and which is of simple construction adapted to be installed at a moderate expense and operated with the minimum labor and attention, and the use of which will be free from danger.

Other objects of the invention are to provide means of simple construction, and which will be reliable in operation, for thoroughly and continuously purging or evacuating from the system any air which may leak thereinto; also to increase the capacity of the apparatus and save power in its operation by the provision in the system of an economizer which cooperates with the multiple stage centrifugal compressor so that it is not necessary for all of the vaporized refrigerant to be compressed in all of the several stages of the compressor, portions of the refrigerant vapor being compressed only in a portion of the stages of the compressor; also to provide in the system a rectifier which acts continuously during the operation of the system to remove any oil or other impurities from the refrigerant liquid and maintain the latter in a substantially uniformly efficient condition; also to provide the system with a supplemental condenser which is associated with the main or primary condenser so as to insure an active circulation of the refrigerant vapor through the condenser and increase the efficiency of the same, and reduce to the minimum the loss of refrigerant incident to the evacuation of the air from the system; and also to improve refrigerating systems of the character mentioned in the other respects hereinafter described and set forth in the claims.

In the accompanying drawings which illustrate a practical embodiment of my invention:

Fig. 1 is a plan view of the refrigerating apparatus.

Fig. 2 is an end elevation on an enlarged scale thereof, as seen from the right in Fig. 1.

Fig. 3 is a sectional plan view thereof on line 3—3, Fig. 2.

Fig. 4 is an enlarged sectional elevation of the evaporator and associated parts on line 4—4, Fig. 1.

Fig. 5 is an enlarged sectional elevation of the condenser and associated parts on line 5—5, Fig. 1.

Fig. 6 is an enlarged sectional elevation of the float trap for the return of the refrigerant liquid from the condenser.

Fig. 7 is a transverse section on an enlarged scale on line 7—7, Fig. 14, showing the economizer.

Fig. 8 is a section on line 8—8, Fig. 14, on an enlarged scale, showing the rectifier.

Fig. 9 is an enlarged sectional plan view showing the supplemental condenser.

Fig. 10 is an elevation of the same.

Fig. 11 is a sectional plan view on line 11—11, Fig. 4, showing the air evacuating device.

Fig. 12 is an enlarged sectional elevation on line 12—12, Fig. 11, showing the float valve which controls the return of the liquid refrigerant from the air evacuator to the evaporator.

Fig. 13 is a sectional elevation on an enlarged scale on line 13—13, Fig. 11.

Fig. 14 is an enlarged plan view of the economizer and rectifier.

Fig. 15 is a sectional plan view thereof on line 15—15, Fig. 16.

Fig. 16 is a sectional elevation thereof on line 16—16, Fig. 14.

Fig. 17 is a transverse sectional elevation thereof on line 17—17, Fig. 16.

A represents the evaporator or cooler in which the refrigerant is vaporized and thereby reduces the temperature of the medium to be cooled, B the main condenser for the refrigerant vapor, and C the centrifugal fan or compressor which withdraws the vaporized refrigerant from the evaporator A and delivers it at a higher pressure to the condenser B. As usual, in compression refrigerating systems, the liquefied refrigerant is returned from the condenser to be again vaporized, compressed and condensed. The compressor is driven by a suitable motor, not shown, preferably an electric motor or steam turbine directly connected with the compressor shaft and adapted to maintain a substantially constant predetermined compressor speed. The compressor draws the refrigerant vapor from the evaporator through a suitable passage or connection D and delivers the compressed vapor to the condenser through a suitable discharge passage E. Eliminators are preferably provided in the suction passage D from the evaporator to intercept and separate any liquid from the vapor leaving the evaporator. These eliminators preferably consist of spaced zig-zag plates 19 between which the vapor passes and on which any liquid entrained with the vapor is deposited. This liquid is adapted to run down the plates and flow back into the evaporator casing.

The evaporator A, see Fig. 4, is preferably constructed so that the liquid refrigerant is caused to flow in thin films over evaporating tubes or passages 20 through which the water or other medium to be cooled circulates. As shown, the casing of the evaporator is provided in its upper portion with a distributing chamber 21 from which the refrigerant overflows through a multiplicity of small tubes 22 extending through the bottom of the distributing chamber and having semi-spherical, perforated, lower ends through which the liquid is dispersed uniformly over the evaporating tubes 20 which are arranged in the evaporator casing below the distributing devices. These distributing tubes are open at their upper ends and project up into the distributing chamber above the bottom thereof so that the liquid overflows from the latter through the tubes and is evenly distributed by the tubes uniformly over the top row of the evaporating tubes 20, whereby the liquid is caused to flow downwardly gently in thin films over the surfaces of the whole group of evaporating tubes. The liquid which is not vaporized collects in the bottom of the evaporator casing below the evaporating tubes. The latter are not submerged in the liquid and therefore there is no liquid head which must be overcome by the pressure of the vapor. A refrigerant circulating pump 23, preferably a centrifugal pump driven by any suitable motor 23ª or other driving means, draws the liquid from the bottom of the evaporator casing through a suction pipe 24 and delivers the same through a discharge pipe 25 into the upper distributing chamber 21 of the evaporator. The water or medium to be cooled preferably passes back and forth through successive groups of the evaporating tubes 20 so as to be cooled by the surface evaporation of the liquid refrigerant on the tubes. Illustration of the circulating means for the medium being cooled is not necessary to an understanding of the invention, but the necessary provisions are made for delivering the cooled water or medium to the point where it is to be utilized and for returning the same or supplying fresh water or medium to the evaporating tubes to be cooled, depending upon the purpose for which the refrigerating apparatus is employed.

The compressor C, which is a centrifugal or non-positive type compressor, adapted to handle large volumes of vapor at low pressures, may be of any suitable construction, but preferably is a multiple stage centrifugal compressor having a plurality of rotors in rotor chambers in which the vapor is given successive compressions for increasing its final pressure. A direct connected turbine or electric motor is preferably employed for driving the motor.

The condenser B is adapted to condense the vaporized refrigerant, preferably though not necessarily at a pressure below 1 atmosphere, by means of water at natural temperatures which is circulated through suitable pipes 26, Fig. 5, arranged in the condenser casing. The circulating connections for the condensing water not being necessary to an understanding of the invention, are not shown. The tubes 26 for the condensing water are preferably arranged in several groups through which the water circulates in succession, and suitable baffles or walls 27 and 28 are preferably arranged in the condenser casing so as to cause the refrigerant vapor entering the condenser to first pass downwardly over a portion of the tubes, then under the baffle 28 and upwardly over the remaining tubes to the upper portion of the condenser casing from which a portion of the densest vapor together with any air which may be present are withdrawn, as hereinafter explained, for evacuating the air from the system.

The condenser B is preferably constructed so that the vapor entering the condenser first flows downwardly over a portion of the cooling tubes or surfaces 26 and then flows in an ascending direction over further cooling surfaces to a vapor outlet at the upper portion of the condenser. This arrangement preferably supplemented by a counterflow of the condensing water which passes first through the upper tubes 26 so that the upper tubes are coldest, tends to cause the dense vapor and any air mixed therewith in the ascending portion of the condenser to separate under the influence of gravity and the air to rise to the top of the condenser from which point the air and dense vapor are withdrawn to separate the vapor from the air by the before mentioned air evacuating device.

For the purpose of saturating and cooling the vapor entering the condenser and partially relieving the work of the condenser, the liquefied refrigerant is caused to discharge from the condenser through a saturator or device through which the refrigerant vapor is delivered from the compressor into the condenser. This saturator, see Fig. 5, preferably comprises an open ended passage 30 which connects with the compressor discharge pipe E and extends into the condenser casing below a collecting pan 31 arranged beneath the condensing tubes 26. The passage 30 is preferably formed with a top wall 32 which is depressed between its ends so that the passage enlarges toward its opposite ends from a contracted middle portion in the manner of a Venturi tube, and a receptacle 33 is formed above the passage adapted to receive the liquefied refrigerant discharging from the condenser. The liquid discharges into this receptacle 33 at one side of a dam or weir 34 therein through a drain tube 35 which depends from the collecting pan 31. The liquid collects in one compartment of the receptacle 33 and is adapted to flow over the weir 34 into the other compartment, from which it is adapted to fall through perforations in the bottom of the receptacle 33 into the passage 30 through which the vapor enters the condenser. The drain tube 35 dips into the liquid in the receiving compartment of the receptacle 33 and forms a liquid seal which prevents the passage of vapor through the drain tube. The cooled liquid from the condenser meeting the warm vapor from the compressor flowing through the saturator passage 30, cools and saturates the vapor so that when the vapor reaches the condensing tubes of the condenser it is already cooled and condensed to some extent, and to that extent relieves the work of the condenser.

37 represents a supplemental condenser through which a portion of the vapor is drawn from that portion of the main condenser B where the vapor is densest. Preferably, this supplemental condenser is located as shown in Fig. 5, within the upper portion of the casing of the main condenser above the condensing tubes 26, and consists of a multiplicity of small, closely spaced tubes 38, see Figs. 9 and 10, arranged within a casing 39. The vapor from the main condenser enters the supplemental condenser through an inlet opening 40 near one end of the casing 39, and the latter is provided with baffles or passages indicated in Fig. 9, arranged so as to cause the vapor to follow a circuitous path through successive groups of the tubes 38 and leave the supplemental condenser through a discharge pipe 41. The water or cooling medium for this supplemental condenser is supplied to one end of the casing 39 by an inlet pipe 42 and leaves the opposite end of the casing through a discharge pipe 43, the water passing through the narrow spaces between the tubes 38, and thus acting to further cool or condense the refrigerant vapor which has already been partially condensed in the main condenser. A colder cooling medium is preferably employed in the supplemental condenser than in the main condenser, and cold water, if available, or artificially cooled water or brine, if necessary, can be used for the supplemental condenser.

The vapor is withdrawn from the main condenser through the supplemental condenser by means of an evacuating device which positively pulls the vapor and any air which may leak into the system through the supplemental condenser, and thereby creates an active circulation of the vapor and air through the same and the main condenser. This evacuating device, see Figs. 3 and 11, preferably consists of an ejector 45 through which a comparatively small volume of the liquid refrigerant is circulated by means of a pump 46, preferably a small centrifugal pump, which is located within an air separating chamber or casing 47 arranged exteriorly of and connected to the casing of the evaporator A. 46ª, Fig. 4, indicates a motor for driving the pump 46. A body of the refrigerating liquid is maintained in the separating chamber 47, as presently explained, and the pump 46 circulates the liquid from this chamber through the ejector 45 from which the liquid is discharged again into the separating chamber 47, the pump thus acting to continuously circulate a small volume of the liquid refrigerant through the ejector. The vapor discharge pipe 41 from the supplemental condenser connects with the ejector 45 so that the liquid refrigerant passing through the ejector acts to draw vapor and air from the supplemental condenser and discharge the same, together with the liquid refrigerant into the separating chamber 47. The pump 46 connects with the ejector 45 by a liquid cooling pipe or coil 48 which preferably extends from the pump discharge connection 48ª in the separating chamber 47 and, together with the ejector, is located in the lower portion of the evaporator casing so as to be cooled by the low temperature existing therein. The vapor discharge pipe 41 from the condenser also preferably connects with the ejector 45 through a cooling pipe or coil 49 located in the lower portion of the evaporator casing and which, as shown, connects with the pipe 41 through a cored passage in the bottom of the separating chamber. Therefore, the condensed vapor from the supplemental condenser is further cooled or condensed by the cooling coil 49 and further compressed by the ejector 45 so that when the refrigerant liquid and the condensate of the vapor drawn from the condenser are discharged into the separating chamber, practically all of the vapor will have been condensed out of any air which is withdrawn with the vapor from the condenser. The air thus separated can escape from the separating chamber through a suitable air vent pipe 50 leading to the atmosphere from the upper portion of the separating chamber. The separation of the refrigerant vapor from the air in the manner described is so thorough that the loss of any vapor with the escaping air is negligible. This chamber is preferably provided with weirs 51 and 52, Fig. 13, which divide the chamber into an inlet compartment 53 into which the ejector 45 discharges, a pump compartment 53ª and a discharge compartment 53ᵇ. A wall 54 depending from the top of the chamber between the weirs and extending below the top edge of the weir 51 forms a liquid seal between the inlet and pump compartments which prevents the entrance of air into the latter compartment. The liquid flows over the weir 51, which is lower than the weir 52, out of the inlet compartment into the pump compartment and finally flows over the weir 52 into the discharge compartment from which it is trapped back into the lower portion of the evaporator A through a suitable valve 55 and passage 56 controlled by a float 57 arranged to float in the liquid in the discharge compartment 53ᵇ of the separating chamber. This float valve maintains a body of liquid in the separating chamber for circulation through the ejector 45 by the pump 46, and traps back the surplus liquid into the system. The pipe through which the ejector 45 discharges the liquid refrigerant and air into the separating chamber preferably terminates in an enlarged perforated tube 58 which is immersed in the liquid in the inlet compartment 53 of the chamber. This causes a dispersion and gentle discharge of the liquid into the inlet compartment of the separating chamber and permits the air which is discharged with the liquid to rise through the liquid and escape from the separating chamber through the air vent pipe 50.

The refrigerant liquid can be initially placed in the air separating chamber 47 in any convenient way. As the chamber has a removable top, the liquid can be poured into the chamber before this top is secured in place, or if desired, the chamber can be provided with an inspection and filling opening closed by any suitable cover adapted to be opened. During the operation of the refrigerating system, after the liquid has been put in the chamber, the supplemental condenser 37 provides a surplus or make-up liquid for the maintenance of the level of the liquid in this separating chamber 47 that compensates for leaks in the valve 55, etc., and also provides the necessary surplus for a liquid seal for the main liquid circulating pump 23, as later explained.

In the above described method of evacuating the air from the system, liquid used for the air expulsion is drawn from and returned to the air separating chamber 47 in which atmospheric pressure is maintained. The entire body of liquid used in the air expulsion is operated at or above atmospheric pressure. While I have shown an ejector for evacuating the air, the invention is not confined to the ejector type of evacuation, since the combined centrifugal pump and ejector could be replaced by a liquid piston pump of the rotary displacement type, such as disclosed in my application Serial No. 441,876, for example, operating in the same way to circulate the liquid through the separating chamber.

59, Figs. 1, 3 and 4, represents a pipe or passage for delivering liquid from the separating chamber 47 to provide a liquid seal for the opening through which the shaft of the main liquid pump 23 extends for connection with its driving motor. As this pump 23 draws the liquid from the evaporator A in which the pressure is below one atmosphere, the sealing liquid at or above atmospheric pressure from the separating chamber is adapted to form an effective liquid seal for the pump.

In its return from the condenser B to the evaporator A, the liquefied refrigerant passes through a device F hereinafter called an economizer which cooperates with the compressor C in such a way that it is not necessary for that portion of the refrigerant which is vaporized before it reaches the cooling tubes of the evaporator to pass through and be compressed in all of the stages of the compressor, the economizer thus serving to save power and increase the efficiency of the apparatus.

The economizer comprises one or more, preferably four, chambers or compartments 60, 61, 62 and 63 which are respectively connected directly with a corresponding number of the stages of the compressor C as by passages 64 leading from the upper portion of each compartment to the corresponding stage of the compressor. The liquefied refrigerant passes from the main condenser through a trap or float valve 65 of any suitable construction, and a pipe 66 to the first compartment 60 of the economizer, and from one to another of the compartments 60—63 of the economizer through connecting passages 67, 68 and 69. The liquid return pipe 66 from the condenser trap preferably connects with a chamber 70 below the first compartment 60 of the economizer which the liquid enters from the chamber 70 through a suitable check valve 71. The passages 67—69 connecting the compartments of the economizer with each other are controlled by valves 72 actuated by floats 72ª in the compartments 60—62 so that when the liquid rises in the first compartment 60 to the level determined by the float therein, the first valve will open and permit the liquid to pass into the next compartment 61, the liquid being similarly admitted from each compartment to the next when the liquid rises to the required level in one compartment to open the float valve leading to the next compartment. The liquid is adapted to flow from the last compartment 63 of the economizer through a descending passage 73 and a pipe 74 into the lower portion of the evaporator casing. The pipe 74 preferably has an enlarged upwardly extending portion 74ª entering the lower portion of the evaporator casing A and the l'quid is adapted to overflow quietly from the open upper end of the enlargement 74ª into the evaporator. This pipe 74 forms a liquid seal which prevents the escape of the vapor from the evaporator through the pipe 74 and economizer into the compressor. The economizer is also preferably formed with a passage 75 in its lower portion which extends beneath the compartments 61—63 from the chamber 70 to the passage 73 and preferably connects with the compartments 61 and 62 by means of small openings 76 in the bottoms of these compartments. The discharge end of this passage 75 is normally closed by a hand valve 77 of any suitable construction which prevents communication between the passage 75 and the discharge passage 73 from the last compartment 63 of the economizer.

When the liquefied refrigerant from the condenser B enters the first compartment 60 of the economizer, a portion of the liquid will vaporize in this compartment and the vapor will be drawn directly therefrom through the first passage 64 into the connecting stage of the compressor so that this vapor will be compressed only in this stage of the compressor and in subsequent stages, if any, and will not pass through the preceding compressor stages. When the refrigerant liquid passes from the first compartment 60 through the float valve to the next compartment 61, there will again be some vaporization of the refrigerant, and this vapor will be drawn directly from this compartment 61 to the stage of the compressor connected therewith and will be compressed only in the last two stages of the compressor, or in any subsequent stages, but will not pass through the preceding stages. In like manner, the liquid passes in succession through the other compartments of the economizer and the vapor is similarly withdrawn from each of these compartments into a different stage of the compressor.

In passing through the economizer, the liquid refrigerant undergoes successive partial vaporizations, each of which lowers somewhat the temperature of the liquid, and when the liquid enters the evaporator A there will be very little vaporization thereof until the liquid contacts with the evaporating tubes 20 where the vaporization will be effective in lowering the temperature of the medium to be cooled. Therefore, the percentage of the vapor generated in the evaporator out of contact with the evaporating tubes and which produces little effect in cooling, but which nevertheless would have to be again compressed in the compressor, is materially reduced, and the efficiency of the apparatus is proportionately increased with a saving in power.

The economizer passages 67—69 are preferably of greater height than necessary merely for the flow of the liquid through them, and connect at their upper portions with the compartments 61—63 (see Fig. 7) as well as by the valve controlled liquid openings at their lower portions. These passages thus form baffles or expansion chambers which prevent surging of the liquid and gas as they pass from one compartment to the next, from disturbing the float in the receiving compartment. This construction also helps in the separation of the vapor from the liquid, which latter falls down and flows out at the bottom while the vapor tends to rise and pass out at the top of the passages. In a refrigerating apparatus of commercial size, there is a flow of several gallons of liquid per minute with a consequent formation of a number of cubic feet of gas per minute in each stage of the economizer. This gas has to be separated from the liquid so that the liquid will be left behind and only the gas will pass out to the compressor. Each compartment of the economizer described forms a combined separator and trap; primarily a separator and secondarily a trap.

The refrigerant liquid can be drained from the economizer by opening the hand valve 77 and a drain cock 78, Fig. 2, in the return pipe 74. The liquid will then drain directly out of the compartment 63 and from the other compartments 60 to 62 through the small openings 76 connecting these compartments with the passage 75.

Baffles are preferably provided in the economizer compartments 60—62 between the liquid inlets and vapor outlets thereof to separate any liquid from the vapor and prevent the liquid from being drawn into the compressor. As shown in Fig. 7, the baffles in each compartment comprise an inclined plate 79 below the vapor outlet passage 64, a bent plate 79ª spaced from and overhanging the upper end of the plate 79, and a depending flange 79ᵇ between the plate 79ª and the passage 64. These baffles deflect the vapor and intercept any liquid, which latter is adapted to run down the inclined plate 79 back to the body of liquid in the bottom of the compartment, the lower end of the inclined plate being spaced from the rear wall of the compartment to permit the passage of the liquid. Any other suitable sort of liquid eliminating means could be employed.

G represents a rectifier or device to which a more or less continuous flow of the refrigerant from the evaporator is maintained during the operation of the system for the purpose of concentrating through distillation and eliminating the impurities including oil, water and dirt, which are less volatile than the refrigerant. The liquid refrigerant is delivered from the body of liquid in the evaporator to the rectifier through a suitable connection which prevents any backward leakage, or diffusion from the rectifier to the evaporator, and also maintains a lower level of the liquid in the rectifying chamber than in the evaporator and prevents any flooding of the rectifying chamber. The liquid is evaporated in the rectifier by conduction of heat from an external source, which is preferably the warm liquid returning from the condenser, and the gas or vapor is returned from the rectifier to the system as fast as it is evaporated through a suitable connection which equalizes the pressure on the liquid in the rectifier.

As shown in the drawings, the rectifier consists of a receptacle preferably formed by an additional chamber in the body of the economizer next to but not communicating with the first compartment 60 of the economizer. The liquefied refrigerant is admitted to the rectifier chamber G through a pipe 80 which connects with the lower portion of the evaporator A and is provided with a suitable check valve 81. Admission of the liquid into the rectifier is controlled by a valve 82 actuated by a float 83 in the rectifier. This float is adapted to maintain a predetermined level of the liquid in the rectifier chamber lower than the lowest level in the evaporator. The check valve and float valve prevent backward leakage or diffusion from the rectifier chamber to the evaporator and the float valve also prevents flooding of the rectifier chamber when the liquid level is high in the evaporator. A pipe or passage 84 connects the upper portion of the rectifier chamber to the first stage of the compressor or other suitable point of low pressure in the system so that the vapor from the refrigerant liquid in the rectifier will be withdrawn therefrom as fast as formed and the pressure equalized on the liquid in the rectifier. The rectifier chamber is exposed to and heated to some extent by the surrounding atmosphere but the warm return liquid refrigerant in the high pressure compartment 60 of the economizer is primarily relied upon as the source of heat for vaporizing the liquid. It is for this reason that the rectifying chamber is preferably formed integral with the economizer, the wall separating the rectifying chamber from the compartment 60 of the economizer affording an effective heat conduction. There is, therefore, a continuous evaporation or boiling of the refrigerant liquid in the rectifier during the operation of the refrigerating apparatus, the refrigerant being thus distilled off and leaving any oil, water or other impurities contained in the liquid in the rectifier chamber. These impurities can be drained out of the rectifier from time to time, as may be necessary, by opening a drain cock 85, Fig. 16, at the bottom of the rectifier chamber and an air vent cock 86 at the upper portion of the rectifier chamber. After the impure liquid has been drained from the rectifier, the drain valve and vent cock are closed and the operation of the rectifier and system permitted to continue as before. The temperature in the rectifier will rise in proportion as the impurities accumulate therein, and when a predetermined maximum temperature is reached which can be ascertained by means of a suitable thermometer, the impurities can be drained off, as explained.

I claim as my invention:—

1. In a refrigerating system, the combination with an evaporator for a volatile liquid refrigerant, a multiple stage compressor for the refrigerant vapor from the evaporator, and a condenser for the compressed vapor, of an economizer through which the liquefied refrigerant returns from the condenser to the evaporator and which has a plurality of compartments through which the liquid passes in succession, and connections through which refrigerant vapor passes directly from different compartments of the economizer to different stages of the compressor.

2. In a refrigerating system, the combination with an evaporator for a volatile liquid refrigerant, a multiple stage compressor for the refrigerant vapor from the evaporator, and a condenser for the compressed vapor, of an economizer through which the liquefied refrigerant returns from the condenser to the evaporator, and which has a plurality of compartments through which the liquid passes in succession, valves which control the flow of liquid from one to another of said compartments, and each of which is controlled by the level of liquid in the preceding compartment, and connections through which refrigerant vapor passes directly from different compartments of the economizer to different stages of the compressor.

3. In a refrigerating system, the combination with an evaporator for a volatile liquid refrigerant, a multiple stage compressor for the refrigerant vapor from the evaporator, and a condenser for the compressed vapor, of an economizer through which the liquefied refrigerant returns from the condenser to the evaporator, and which has a plurality of compartments through which the liquid passes in succession, baffles between the liquid inlet and vapor outlet of each of said compartments for eliminating entrained liquid from the vapor, and connections through which refrigerant vapor passes directly from different compartments of the economizer to different stages of the compressor.

4. In a refrigerating system, the combination with an evaporator for a volatile liquid refrigerant, a multiple stage compressor for the refrigerant vapor from the evaporator, and a condenser for the compressed vapor, of an economizer through which the liquefied refrigerant returns from the condenser to the evaporator, and which has a plurality of compartments through which the liquid passes in succession, valves which control the flow of liquid from one to another of said campartments. and each of which is controlled by the level of liquid in the preceding compartment, connections through which refrigerant vapor passes directly from different compartments of the economizer to different stages of the compressor, and draining means for said economizer connected with different compartments thereof.

5. In a refrigerating system, the combination with an evaporator for a volatile liquid refrigerant, a compressor for the vaporized refrigerant, and a condenser for the compressed vapor, of an air evacuating device for withdrawing vapor and air from the system, condensing the vapor out of the air and returning the condensate to the system, and a rectifier for vaporizing successive portions of the liquid refrigerant during the operation of the system to separate impurities therefrom and returning the vaporized refrigerant to the system.

6. In a refrigerating system, the combination with an evaporator for a volatile liquid refrigerant, a compressor for the vaporized refrigerant, and a condenser for the compressed vapor, of evacuating means connected with the upper portion of the condenser and adapted to positively withdraw refrigerant vapor and noncondensible gas from the condenser, said condenser being constructed with an ascending passage which connects at its upper portion with said evacuating means and in which the refrigerant vapor after partial cooling in the condenser flows in an ascending current over cooling surfaces of the condenser whereby any noncondensible gas mixed with the vapor tends to separate from the ascending dense vapor and rise to under the influence of gravity and rise to said evacuating connection at the upper portion of the condenser, and a separating device into which said evacuating means delivers the vapor and noncondensible gas and which releases the noncondensible gas and returns the condensed refrigerant vapor to the system.

7. In a refrigerating system, the combination with an evaporator for a volatile liquid refrigerant, a compressor for the vaporized refrigerant and a condenser for the compressed vapor, of an ejector through which a body of the liquid refrigerant is circulated, a connection from the condenser to said ejector whereby the ejector draws refrigerant vapor and air from the condenser and discharges the same with said liquid refrigerant, a separating device into which said ejector discharges the liquid and air and which separates the air from the liquid refrigerant, and means for returning liquid refrigerant from said separating chamber to the system.

8. In a refrigerating system, the combination with an evaporator for a volatile liquid refrigerant, a compressor for the vaporized refrigerant, and a condenser for the compressed vapor, of an ejector through which a body of the liquid refrigerant is circulated, a liquid cooling device through which said liquid refrigerant passes to said ejector, a connection from the condenser to said ejector whereby the ejector draws refrigerant vapor and air from the condenser and discharges the same with said liquid refrigerant, a separating device into which said ejector discharges the liquid and air and which separates the air from the liquid refrigerant, and means for returning liquid refrigerant from said separating device to the system.

9. In a refrigerating system, the combination with an evaporator for a volatile liquid refrigerant, a compressor for the vaporized refrigerant, and a condenser for the compressed vapor, of an ejector through which a body of the liquid refrigerant is circulated, a connection from the condenser to said ejector whereby the ejector draws refrigerant vapor and air from the condenser, means for cooling the vapor and air on their way from the condenser to said ejector, a separating device into which said ejector discharges the liquid and air and which separates the air from the liquid refrigerant, and means for returning liquid refrigerant from said separating device to the system.

10. In a refrigerating system, the combination with an evaporator for a volatile liquid refrigerant, a compressor for the vaporized refrigerant, and a condenser for the compressed vapor, of an ejector through which a body of the liquid refrigerant is circulated, a liquid cooling device through which said liquid refrigerant passes to said ejector, a connection from the condenser to said ejector whereby the ejector draws refrigerant vapor and air from the condenser, means for cooling the vapor and air on their way from the condenser to said ejector, a separating device into which said ejector discharges the liquid and air and which separates the air from the liquid refrigerant, and means for returning liquid refrigerant from said separating device to the system.

11. In a refrigerating system, the combination with an evaporator for a volatile liquid refrigerant, a compressor for the vaporized refrigerant, and a condenser for the compressed vapor, of an ejector through which a body of the liquid refrigerant is circulated, a connection from the condenser to said ejector whereby the ejector draws refrigerant vapor and air from the condenser, and coils cooled by the evaporator and through which the liquid refrigerant and the vapor and air respectively pass to said ejector, a separating device into which said ejector discharges the liquid and air and which separates the air from the liquid refrigerant, and means for returning liquid refrigerant from said separating device to the system.

12. In a refrigerating system, the combination with an evaporator for a volatile liquid refrigerant, a compressor for the vaporized refrigerant, and a condenser for the compressed vapor, of an air and liquid separating chamber containing a body of the liquid refrigerant, an ejector, a pump and connections for circulating said liquid refrigerant from the separating chamber through said ejector and back to the separating chamber, a connection from the condenser to said ejector whereby refrigerant vapor and air are drawn from the condenser and delivered to the separating chamber, an air outlet from said separating chamber, and means for returning liquid refrigerant from said separating chamber to the system.

13. In a refrigerating system, the combination with an evaporator for a volatile liquid refrigerant, a compressor for the vaporized refrigerant, and a condenser for the compressed vapor, of a rectifier to which successive portions of the refrigerant liquid are diverted during the operation of the system, means whereby the heat from the refrigerant liquid returning from the condenser is utilized for vaporizing the refrigerant in the rectifier to separate impurities therefrom, and means for returning the vapor from the rectifier to the system.

14. In a refrigerating system, the combination with an evaporator for a volatile liquid refrigerant, a compressor for the vaporized refrigerant, and a condenser for the compressed vapor, of a rectifier to which successive portions of the refrigerant liquid are diverted during the operation of the system, means whereby the heat from the refrigerating medium at a higher temperature than said liquid is utilized for vaporizing the refrigerant in the rectifier to separate impurities therefrom, and means for returning the vapor from the rectifier to the system.

15. In a refrigerating system, the combination with an evaporator for a volatile liquid refrigerant, a compressor for the refrigerant vapor from the evaporator, and a condenser for the compressed vapor, of an economizer through which the liquid refrigerant returns from the condenser to the evaporator, a connection through which refrigerant vapor passes from said economizer to the compressor, a rectifier adjacent said economizer and heated by the warm liquid therein for vaporizing successive portions of the liquid refrigerant to separate impurities therefrom, and means for returning the vapor from the rectifier to the system.

16. In a refrigerating system, the combination with an evaporator for a volatile liquid refrigerant, a compressor for the vaporized refrigerant, and a condenser for the compressed vapor, of a rectifying chamber, a liquid passage from the evaporator to said rectifying chamber, an automatic device controlling said passage for admitting successive portions of the liquid refrigerant to the rectifying chamber for vaporization therein during the operation of the system, and means for returning the vaporized refrigerant from the rectifying chamber to the system.

17. In a refrigerating system, the combination with an evaporator for a volatile liquid refrigerant, a compressor for the vaporized refrigerant, and a condenser for the compressed vapor, of a rectifying chamber, a liquid passage from the evaporator to said rectifying chamber, an automatic device controlling said passage for admitting successive portions of the liquid refrigerant to the rectifying chamber for vaporization therein during the operation of the system, means for returning the vaporized refrigerant from the rectifying chamber to the system, and means for draining the impurities from said rectifying chamber.

18. In a refrigerating system, the combination with an evaporator for a volatile liquid refrigerant, a compressor for the vaporized refrigerant, and a condenser for the compressed vapor, of means for saturating the vapor entering the condenser comprising a passage through which the vapor flows, means for passing the liquid refrigerant from the condenser through said passage, and a seal formed by said liquefied refrigerant between said passage and the condenser.

19. In a refrigerating system, the combination with an evaporator for a volatile liquid refrigerant, a compressor for the vaporized refrigerant, and a condenser for the compressed vapor, of means for saturating the vapor entering the condenser comprising a passage through which the vapor flows, a receptacle into which the liquefied refrigerant drains from the condenser and from which it discharges into said passage, and a drain pipe from the condenser dipping into the liquid in said receptacle to form a liquid seal.

20. In a refrigerating system in which a volatile liquid refrigerant is evaporated, compressed and condensed, the combination with the evaporator, of a rectifying chamber to which liquid refrigerant is delivered from the evaporator during the operation of the system and which is maintained at a temperature higher than that of the liquid entering it, means for preventing back flow of the liquid to the evaporator, a passage through which the vapor produced in the rectifying chamber is returned to the system and which reduces the pressure on the liquid in the rectifying chamber to permit admission of the liquid to the chamber, and means for discharging the impurities from the rectifying chamber.

21. In a refrigerating system in which a volatile liquid refrigerant is evaporated, compressed and condensed, the combination with the evaporator, of a rectifying chamber to which liquid refrigerant is delivered from the evaporator during the operation of the system and which is maintained at a temperature higher than that of the liquid entering it, means for maintaining the liquid at a lower level in the rectifying chamber than in the evaporator and preventing back flow of the liquid to the evaporator, a passage through which the vapor produced in the rectifying chamber is returned to the system and which reduces the pressure on the liquid in the rectifying chamber to permit admission of the liquid to the chamber, and means for discharging the impurities from the rectifying chamber.

22. In a refrigerating system in which a volatile liquid refrigerant is evaporated, compressed and condensed, the combination with the evaporator, of a rectifying chamber to which liquid refrigerant is delivered from the evaporator during the operation of the system, means whereby the warm liquid returning from the condenser is utilized to heat said rectifying chamber, means for maintaining the liquid at a lower level in the rectifying chamber than in the evaporator, a passage through which the vapor produced in the rectifying chamber is returned to the system and which reduces the pressure on the liquid in the rectifying chamber to permit admission of the liquid to the chamber, and means for discharging the impurities from the rectifying chamber.

23. In a refrigerating system in which a volatile liquid refrigerant is evaporated, compressed and condensed, the combination with the evaporator, of a rectifying chamber, a liquid passage connecting said chamber with the liquid-containing portion of the evaporator, means controlling said passage for maintaining a required level of the liquid in the rectifying chamber and preventing back flow of liquid to the evaporator, said rectifying chamber being heated to vaporize the liquid therein, a connection for conveying vapor from the rectifying chamber to a low-pressure point of the system and which permits the admission of the liquid to the rectifying chamber, and means for discharging the impurities from the rectifying chamber.

24. In a refrigerating system, the combination with an evaporator for a volatile liquid refrigerant, a compressor for the refrigerant vapor, and a condenser for the compressed vapor, of an economizer through which the warm liquid refrigerant returns from the condenser, a connection for the passage of vapor from said economizer directly to the compressor, a rectifying chamber arranged to be heated by the liquid in the high pressure part of the economizer, and to which liquid refrigerant is delivered from the evaporator during the operation of the system, a connection for conveying vapor from the rectifying chamber to a low pressure point of the system and which permits the admission of the liquid to the rectifying chamber, and means for discharging the impurities from the rectifying chamber.

25. In a refrigerating system, the combination with an evaporator for a volatile liquid refrigerant, a multiple stage compressor for the refrigerant vapor from the evaporator, and a condenser for the compressed vapor, of an economizer through which the liquefied refrigerant returns from the condenser to the evaporator and which has a plurality of compartments through which the liquid passes in succession, passages connecting said compartments, valves which control the flow of liquid through said passages from one to another of said compartments and regulate the level of the liquid in said compartments, said passages providing vapor spaces above the liquid therein connecting with said compartments, and connections through which the vapor passes directly from different compartments of the economizer to different stages of the compressor.

26. In a refrigerating system, the combination with an evaporator for a volatile liquid refrigerant, a compressor for the vaporized refrigerant, and a condenser for the compressed vapor, of means for evacuating air from the system comprising a separating chamber having an opening to the atmosphere, liquid circulating means for drawing liquid refrigerant from and returning it to said separating chamber, a connection from the condenser to said liquid circulating means whereby refrigerant vapor and air are withdrawn from the condenser and discharged with the liquid into said separating chamber, and means for separating the air from the liquid in said separating chamber and returning the liquid to the system.

27. In a refrigerating system, the combination with an evaporator for a volatile liquid refrigerant, a compressor for the vaporized refrigerant and a condenser for the compressed vapor, of means for evacuating air from the system comprising a separating chamber having an opening to the atmosphere, liquid circulating means for drawing liquid refrigerant from and returning it to said separating chamber, a connection from the condenser to said liquid circulating means whereby refrigerant vapor and air are withdrawn from the condenser and discharged with the liquid into said separating chamber, a pump for delivering liquid refrigerant coming from the condenser to the evaporator, and a connection for supplying liquid from said separating chamber to form a liquid seal for said pump.

WILLIS H. CARRIER.